United States Patent
Applewhite et al.

(10) Patent No.: US 10,239,477 B1
(45) Date of Patent: Mar. 26, 2019

(54) BATTERY CHARGE MANAGEMENT FOR GEOSYNCHRONOUS SPACECRAFT

(71) Applicant: Space Systems/Loral, LLC, Palo Alto, CA (US)

(72) Inventors: Anthony Applewhite, Half Moon Bay, CA (US); Michel Lannes, Walnut Creek, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 178 days.

(21) Appl. No.: 14/973,186

(22) Filed: Dec. 17, 2015

(51) Int. Cl.
*H02J 7/00* (2006.01)
*B60R 16/033* (2006.01)
*H02J 7/35* (2006.01)

(52) U.S. Cl.
CPC ............ *B60R 16/033* (2013.01); *H02J 7/007* (2013.01); *H02J 7/35* (2013.01)

(58) Field of Classification Search
CPC ................................ B60R 16/033; H02J 7/007
USPC .......................................................... 320/134
See application file for complete search history.

(56) References Cited

U.S. PATENT DOCUMENTS

| | | | |
|---|---|---|---|
| 5,395,706 A | 3/1995 | Hall | |
| 5,675,235 A * | 10/1997 | Nagai | H01M 10/44 320/160 |
| 5,886,499 A | 3/1999 | Hall | |
| 5,939,864 A | 8/1999 | Lenhart et al. | |
| 5,993,993 A * | 11/1999 | Hall | H01M 10/4207 429/144 |
| 6,246,217 B1 * | 6/2001 | Yoshida | B64G 1/425 320/150 |
| 8,244,312 B2 | 8/2012 | Jakes et al. | |
| 8,481,186 B2 | 7/2013 | Jakes et al. | |
| 9,054,396 B2 | 6/2015 | Cheng et al. | |
| 2003/0038610 A1 * | 2/2003 | Munshi | H02J 7/35 320/101 |
| 2003/0193318 A1 * | 10/2003 | Ozawa | H02J 7/0047 320/132 |
| 2012/0212173 A1 | 8/2012 | Ha et al. | |
| 2013/0154541 A1 | 6/2013 | Stickelmaier et al. | |

OTHER PUBLICATIONS

Geis, "Power-Sharing with Electric Propulsion and Secondary Batteries," Technical report AFAPL-TR-71-42, Dec. 1971, 84 pages.

(Continued)

*Primary Examiner* — Richard Isla
*Assistant Examiner* — Johali A Torres Ruiz
(74) *Attorney, Agent, or Firm* — Weaver Austin Villeneuve & Sampson LLP

(57) ABSTRACT

A spacecraft, configured to be operated in a geosynchronous orbit includes a power subsystem, including a battery, and a battery charge controller. The spacecraft is configured to have a power demand, during an eclipse season of the geosynchronous orbit, of 'P' kilowatts and the battery is sized to have a nominal capacity, measured in kilowatt-hours, smaller than 1.2*P/0.85. In some implementations, the battery has a rated charge voltage corresponding to the nominal capacity and the battery charge controller is configured to execute a battery charge management strategy that charges the battery to an above-rated charge voltage during selected portions of the eclipse season.

17 Claims, 6 Drawing Sheets

Day of the Eclipse Season

(56) References Cited

OTHER PUBLICATIONS

Machlis, "On-Orbit NiH2 Battery Performance and Problem Solving on the Apex Spacecraft," Orbital Sciences Corporation, Virginia, 9 pages.

Sakoda et al., Preliminary Design of the Naval Postgraduate School Petite Amateur Navy Satellite (PANSAT) Electric Power and Communications Subsystems, Calhoun Institutional Archive of the Naval Postgraduate School, Aug. 1990, http://hdl.handle.net/10945/37321 downloaded on Jul. 6, 2015 at 15:50:03, 13 pages.

* cited by examiner

BATTERY CHARGE MANAGEMENT FOR GEOSYNCHRONOUS SPACECRAFT

TECHNICAL FIELD

This invention relates generally to geosynchronous spacecraft and, in particular, to techniques for managing battery state of charge so as to increase effective battery capacity.

BACKGROUND

The assignee of the present invention manufactures and deploys spacecraft for, inter alia, communications and broadcast services, some of which are configured to operate in a geosynchronous earth orbit (GEO). Such spacecraft include a power subsystem including solar arrays and batteries sized to support spacecraft power demands over a mission life (of, for example, fifteen years). A spacecraft in the GEO orbit experiences full sunlight throughout a 24 hour day except for two "eclipse seasons", one eclipse season centered around the time of the vernal equinox and a second eclipse season centered around the time of the autumnal equinox. During eclipse seasons, which have a duration of about 45 days, a daily eclipse occurs at about midnight local satellite time, the duration of the eclipse being about 1.2 hours or less. The batteries of GEO spacecraft are generally sized to support spacecraft power demands during eclipse periods and, as a result, experience periodic discharges as illustrated in FIG. 1. More particularly, the batteries are conventionally sized such that worst case depth of discharge (resulting from the longest eclipse duration at satellite end of life (EOL)) is not greater than 80%.

Some techniques for operating a battery of a spacecraft configured to operate in GEO (a "GEO spacecraft") are disclosed in U.S. Pat. Nos. 5,886,499 and 5,939,864, assigned to the assignee of the present invention, and hereby incorporated into the present disclosure in their entireties for all purposes.

For a typical GEO spacecraft having a DC power demand of 15 kW, a battery capacity of 22.5 KW-hrs (15 KW×1.2 hours/0.8) may be required, which implies a very substantial mass and volume overhead cost to the spacecraft design.

Thus, techniques for increasing effective battery capacity without increasing battery size are desirable.

SUMMARY

The present inventors have appreciated that, for a battery of a GEO spacecraft a rated charge voltage of cells of the battery may be intentionally exceeded during selected periods without materially degrading safety margins or battery reliability. By using a higher ("above-rated") charge voltage, the effective cell capacity may be increased, and the battery may be sized to have a nominal capacity substantially smaller than would be required by conventional design criteria.

According to some implementations, a spacecraft includes a power subsystem, including a battery, and a battery charge controller. The spacecraft is configured to be operated in a geosynchronous orbit; and the spacecraft is configured to have a power demand, during an eclipse season of the geosynchronous orbit, of 'P' kilowatts and the battery is sized to have a nominal capacity, measured in kilowatt-hours, smaller than 1.2*P/0.85.

In some examples, the battery may have a rated charge voltage corresponding to the nominal capacity and the battery charge controller may be configured to execute a battery charge management strategy that charges the battery to an above-rated charge voltage during selected portions of the eclipse season. In some examples, the above-rated charge voltage is at least 5% higher than the rated charge voltage. In some examples, the selected portions of the eclipse season may include selected days centrally located within the eclipse season. In some examples, the battery charge management strategy may result in a maximum depth of discharge of the battery no greater than 80%. In some examples, the battery charge controller may be configured to execute the battery charge management strategy autonomously. In some examples, the battery may be a lithium-ion battery. In some examples, the rated charge voltage may be 4.1 volts, and the above-rated charge voltage may be 4.3 volts.

According to some implementations, a method includes operating a spacecraft in a geosynchronous orbit, the spacecraft including a power subsystem, the power subsystem including a battery, and a battery charge controller, and executing a battery charge management strategy for controlling a state of charge of the battery. The spacecraft is configured to have a power demand, during an eclipse season of the geosynchronous orbit, of 'P' kilowatts and the battery is sized to have a nominal capacity, measured in kilowatt-hours, smaller than 1.2*P/0.85.

According to some implementations, a non-transitory computer readable medium has software stored thereon, the software including instructions for causing a battery charge controller to: execute a charge management strategy for controlling a state of charge of a battery the battery being included in a spacecraft operating in a geosynchronous orbit. The spacecraft is configured to have a power demand, during an eclipse season of the geosynchronous orbit, of 'P' kilowatts and the battery is sized to have a nominal capacity, measured in kilowatt-hours, smaller than 1.2*P/0.85.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Figure 1:
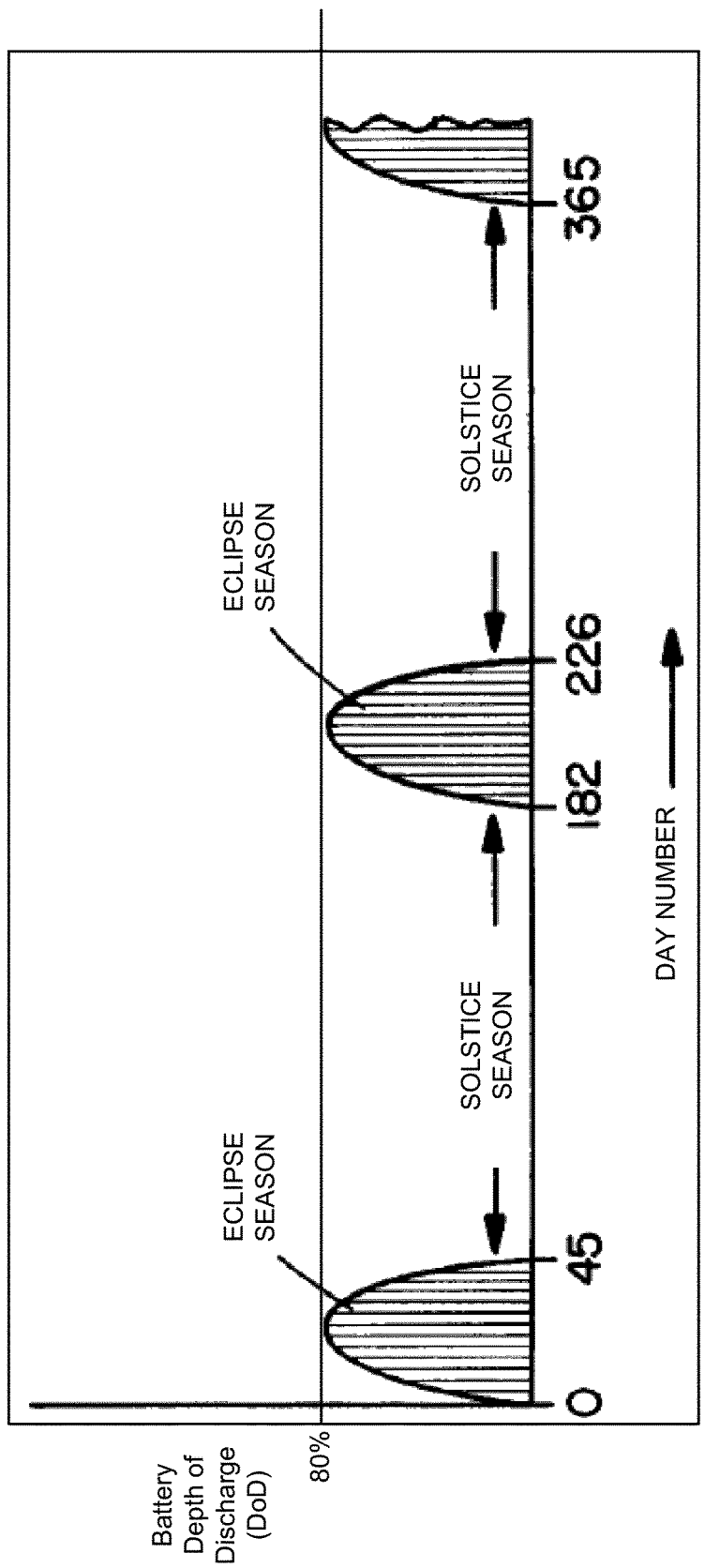
FIG. 1 illustrates an example of battery depth of discharge over the course of a year for a geosynchronous spacecraft.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

The present disclosure relates to managing battery state of charge so as to increase effective battery capacity, taking into account specific operating conditions of a GEO spacecraft and battery performance, life and reliability characteristics. In the absence of the presently disclosed techniques, battery cell energy capacity is a function of the cell manufacturer's rated charge voltage. For example, a known lithium ion battery cell has a manufacturer's nameplate capacity ("nominal capacity") of 110 amp hours when new (i.e., at beginning of life (BOL)) when charged to a rated BOL charge voltage of 4.1V. At end of life (EOL), the same battery cell has a capacity of 102 amp hours when charged to a rated EOL charge voltage of 4.2V.

Charging the battery cell to a voltage higher than the rated charge voltage is discouraged by the cell manufacturer because it is known that repeated excursions above the rated charge voltage tends to degrade cell performance and life and degrade safety margins.

The present inventors, however, have appreciated that, at least for spacecraft batteries only required to accommodate a typical GEO mission life (about 90 discharge cycles per year resulting from eclipse operations for 15 years, most of the discharge cycles being to a depth of discharge less than 50%), the rated charge voltage may be intentionally exceeded during selected periods without materially degrading safety margins or battery reliability. By using a higher ("above-rated") charge voltage, the effective cell capacity may be increased. For example, referring now to FIG. 2, Detail A, a 0.1 V (2.5%) increase in charge voltage has been shown to increase effective cell capacity by more than 10%.

Figure 2:
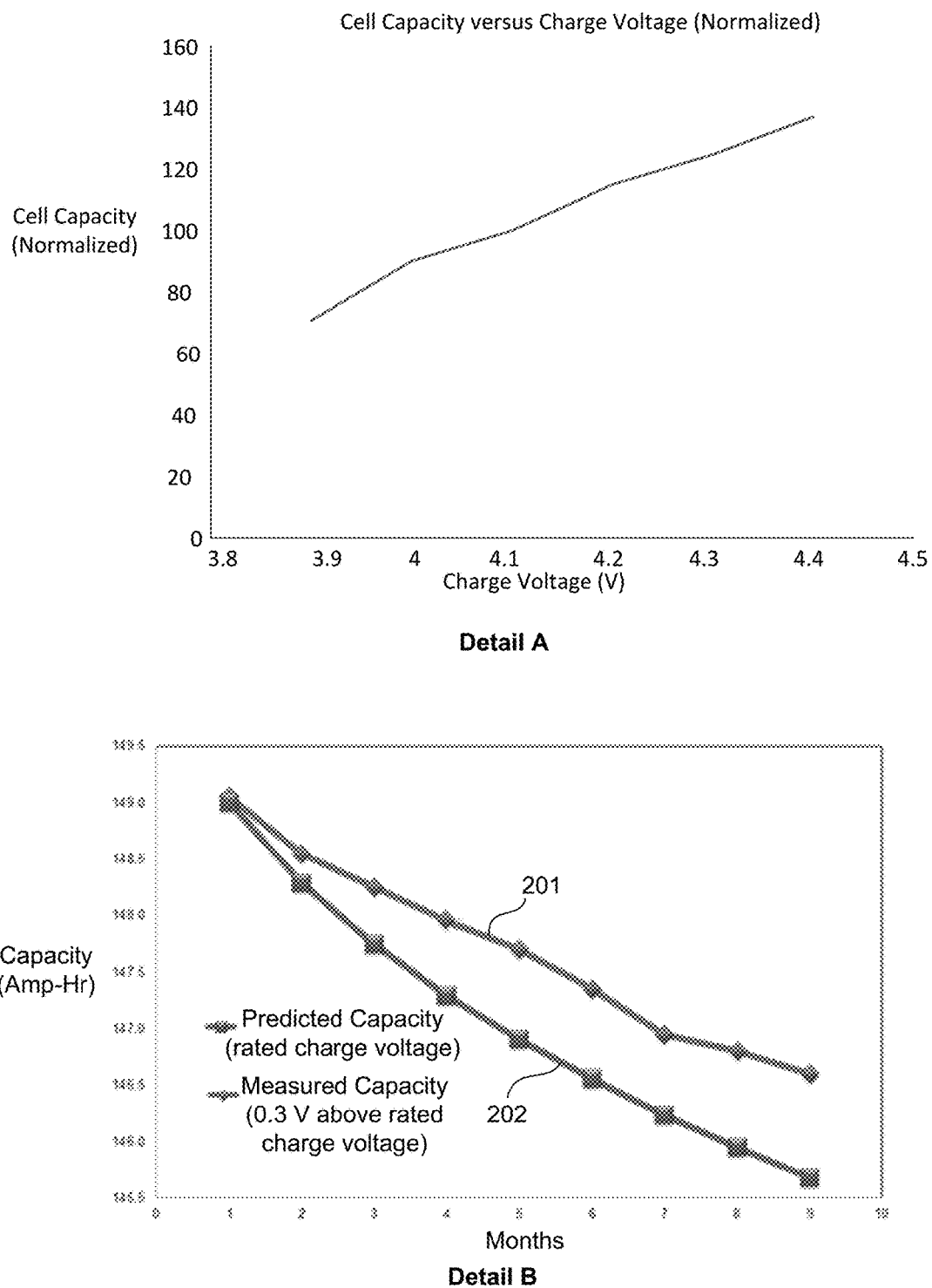
FIG. 2 illustrates examples of battery cell capacity data as a function of charge voltage and time.

Referring to FIG. 2, Detail B, the inventors have measured cell capacity versus time during a life test performed on a lithium ion battery cell using an above-rated charge voltage that is about 0.3V higher than the 4.1V rated charge voltage value, as depicted in plot 201. Surprisingly, cell capacity degraded at a lower rate than predicted by a standard life model, as depicted in plot 202 that assumed use of the rated 4.1V charge voltage.

Figure 3:
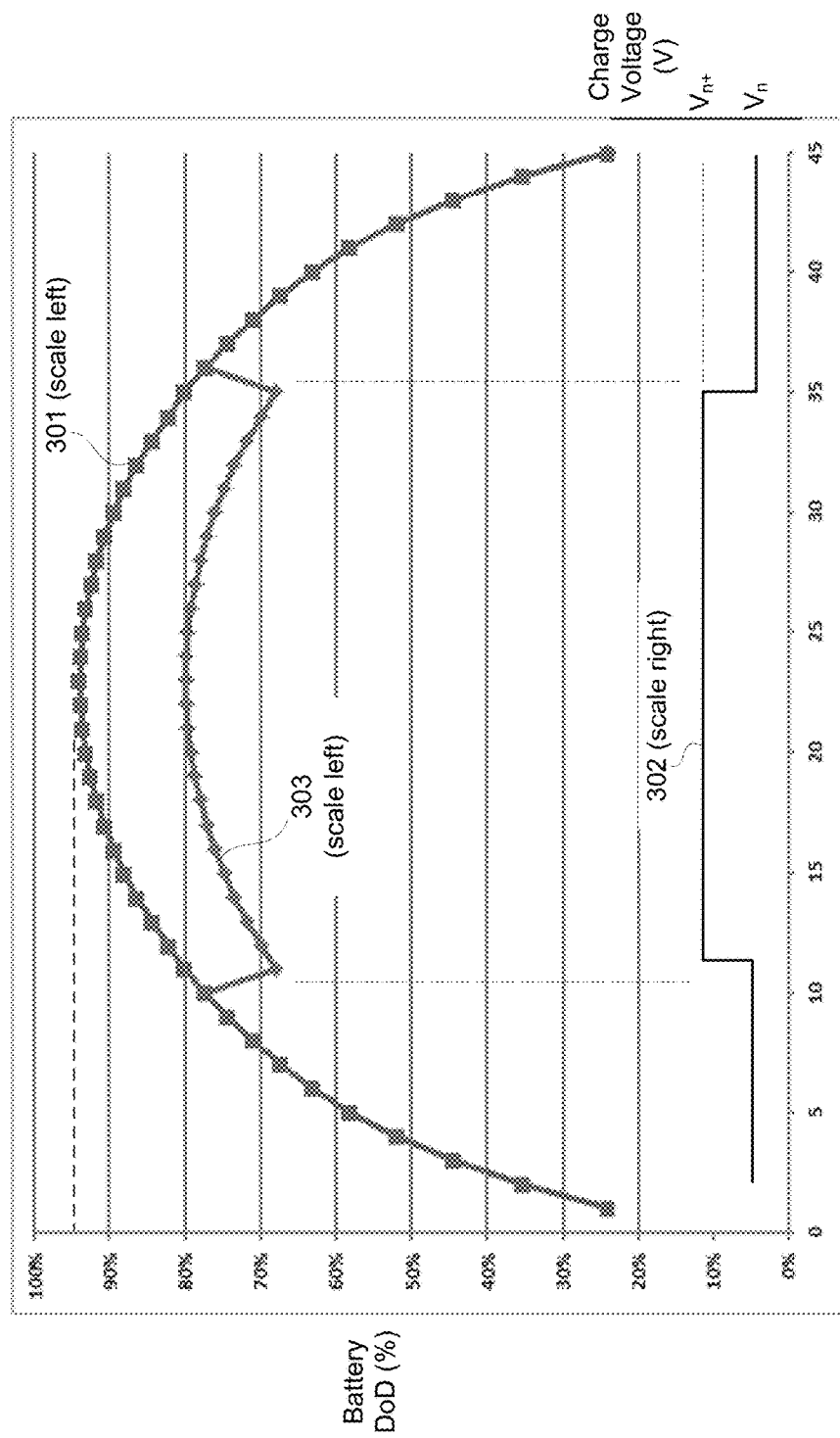
FIG. 3 illustrates an example of a battery charge management strategy according to an implementation.

In some implementations contemplated by the present disclosure, the spacecraft battery may be intentionally undersized relative to conventional spacecraft design requirements. For example, as indicated above, a GEO spacecraft having a DC power demand of 15 KW, may conventionally require a battery capacity of 22.5 KW-hrs (15 KW×1.2 hours/0.8). In some implementations, the battery may have a nominal capacity that is substantially undersized with respect to the conventionally determined 22.5 KW-hrs. For example, it may be contemplated to size the battery to have a nominal capacity of 20.5 KW-hrs. As a result, referring now to FIG. 3, peak depth of discharge based on the battery's nominal capacity (plot 301) would be about (1.2 hrs)×(15 KW)/20.5 KW-hrs=88%. In order to avoid exceeding an 80% depth of discharge criteria, however, a battery charge management strategy that charges the battery to an above-rated charge voltage is contemplated. In the illustrated example, the battery charge management strategy includes applying a battery charge voltage profile 302. The illustrated battery charge voltage profile 302 provides that, during days proximate to the peak eclipse duration (in the illustrated example, from day 11 to day 35 of an eclipse season), battery charging will be performed at an above-rated charge voltage ($V_{n+}$). In some implementations, the above-rated charge voltage may be, for example, 4.3V at BOL rather than a rated value ($V_n$) of 4.1 V. As a result, the effective battery capacity is increased sufficiently during the peak demand period of the eclipse season such that the 80% DoD criteria is not exceeded (plot 303).

Figure 4:
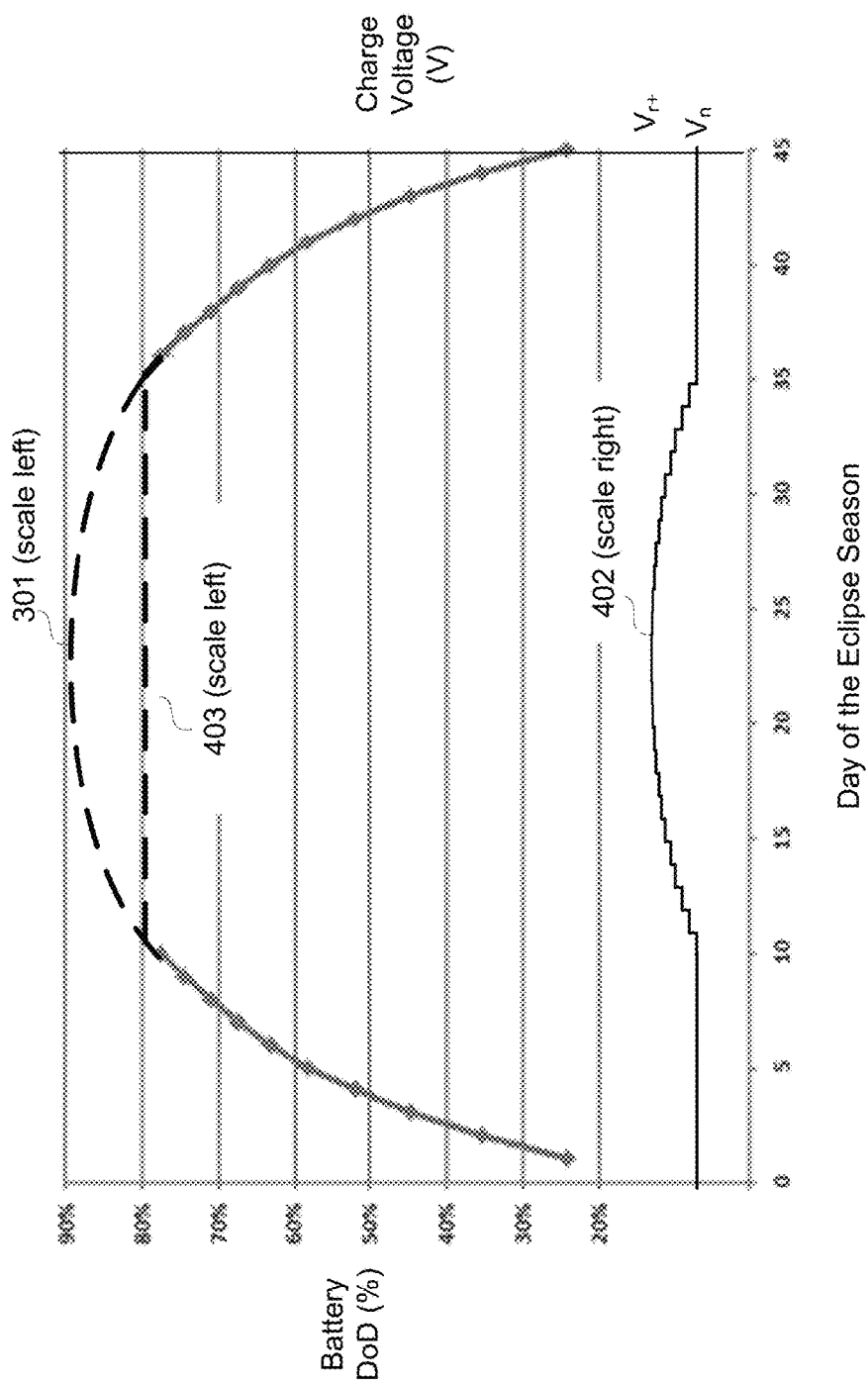
FIG. 4 illustrates an example of a battery charge management strategy according to a further implementation.

FIG. 4 illustrates a further example of a battery charge management strategy. In the illustrated example, the battery charge management strategy includes applying a battery charge voltage profile 402. The illustrated battery charge voltage profile 402 provides that, during days proximate to the peak eclipse duration (in the illustrated example, from day 11 to day 35 of an eclipse season), battery charging will be performed at a variably selected charge voltage higher than the rated charge voltage ($V_n$). The value of the variably selected charge voltage may be chosen so as to provide a varying effective battery capacity such that the peak depth of discharge approaches but does not exceed 80% (plot 403).

Figure 5:
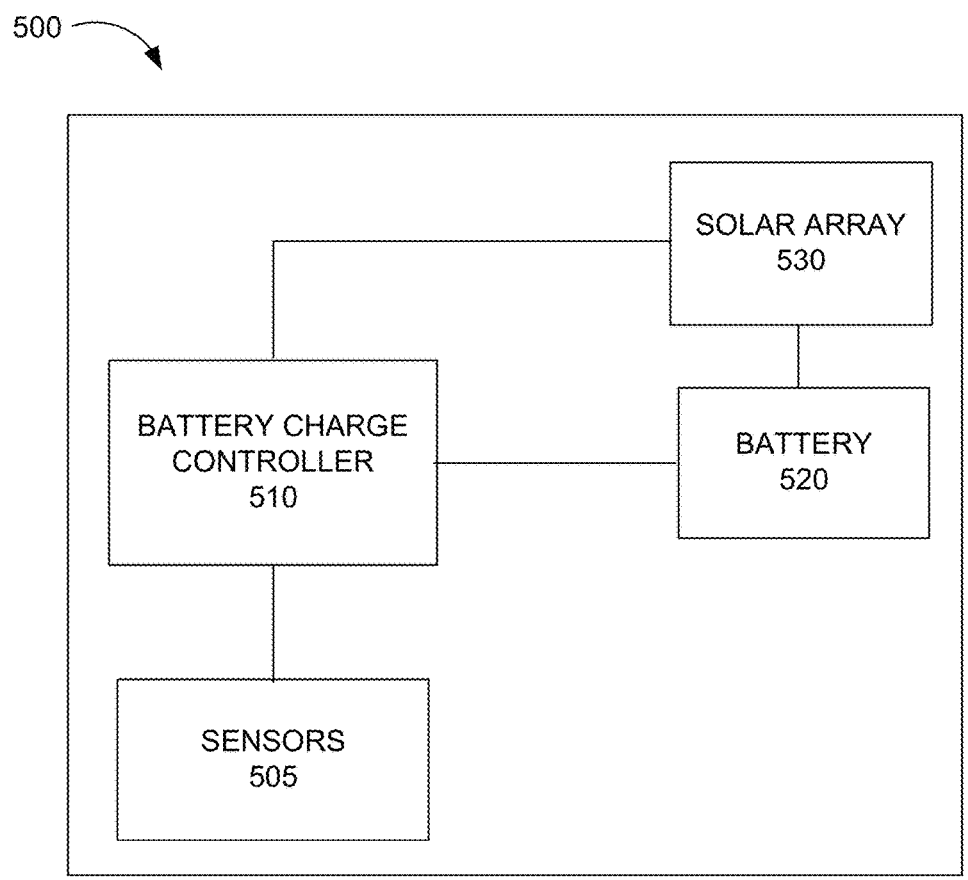
FIG. 5 illustrates a simplified block diagram of a geosynchronous spacecraft according to an implementation.

FIG. 5 illustrates a simplified block diagram of a GEO spacecraft according to some implementations. A spacecraft 500 may include battery 520, a battery charge controller 510, sensors 505, and a solar array 530. The battery 520 may be electrically coupled with the solar array 530 and may receive charging power therefrom. The battery charge controller 510 together with the sensors 505 may be configured to provide a high degree of autonomous control of the state of charge of the battery 520. For example, the sensors 505 may be configured to determine an onset and/or a termination of an eclipse period, and to monitor the state of charge of the battery 510.

In some implementations, the battery charge controller 510 may be configured to provide autonomous management of the battery. For example, the autonomous management may include executing a battery charge management strategy in which, for a selected temporary period, the battery is temporarily boosted to a higher capacity (in some implementations about 20% greater) by charging the battery to an above-rated voltage.

The selected temporary period during which battery may be charged to the above-rated voltage may be related to a peak demand period (i.e., periods of an eclipse season during which duration of the daily eclipse is close to maximum). Outside of the peak demand periods, the battery charge management strategy may avoid exceeding the rated voltage. In some implementations, the battery charge controller 510 may be configured to take into account time of year (day of the eclipse season) and to track the depth of discharge of battery 520 for each day of the eclipse season. The battery charge controller 510 may be configured to take into account temperature of the battery and to track actual battery capacity in view of battery temperature and the presence/absence of failed cells.

In some implementations, the battery charge controller 510 may be configured to execute an autonomous battery management strategy that takes into account trends in actual spacecraft power load during eclipse. The autonomous battery management strategy may include determining a duty cycle for applying the above-rated charge voltage. The determined duty cycle may include parameters relating to the duration, magnitude and frequency of applying the above-rated charge voltage. Consequently, the autonomous battery management strategy may temporarily increase the battery capacity as required to assure that a specified depth of discharge is not exceeded. Application of the above-rated charge voltage may be tailored, as desired. For example, the timing of application of the above-rated charge voltage may be selected such that intervals of time the battery experiences above-rated charge voltage occurs at more beneficial battery temperatures. As a further example, the autonomous battery management strategy may avoid application of the above-rated charge voltage when additional capacity is not required. For example, during days of the eclipse season outside the peak demand period the strategy may avoid application of the above-rated charge voltage. In some implementations the autonomous battery management strategy may be executed without involvement of ground personnel.

Figure 6:
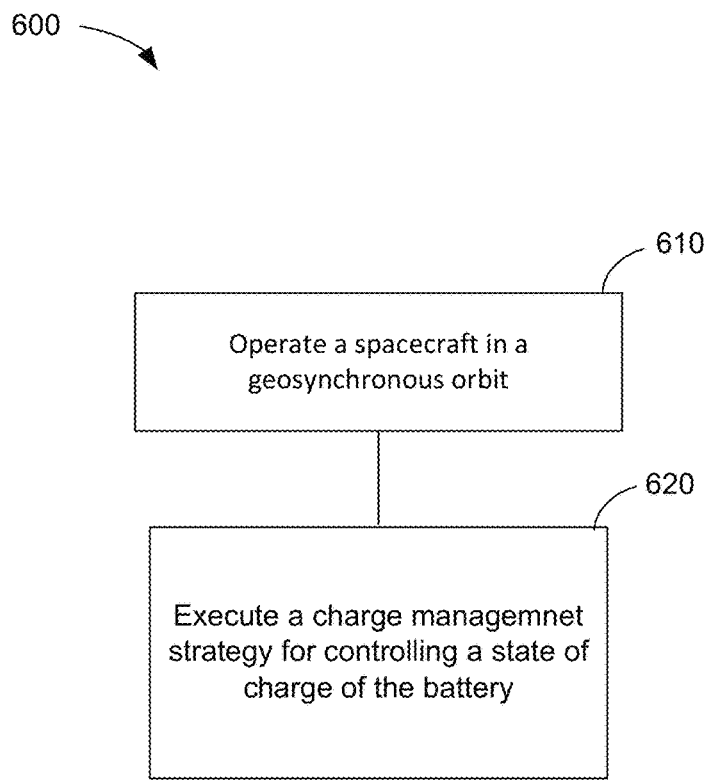
FIG. 6 illustrates a battery charge management method for geosynchronous spacecraft according to an implementation.

Referring now to FIG. 6, a battery charge management method for GEO spacecraft is described. The method 600 may begin, at block 610, with operating the spacecraft in a geosynchronous orbit. The spacecraft may include a power subsystem including a battery in a battery charge controller. Advantageously, the battery may be sized to have a nominal capacity such that that the worst case depth of discharge resulting from the longest eclipse duration, in the absence of the presently disclosed techniques, would be substantially greater than 80%. For example the battery may be sized to a nominal capacity, at a rated charge voltage, not larger than 1.2*P/0.85, where P is the spacecraft power demand during eclipse.

The method may continue, at block 620, with executing a charge management strategy for controlling a state of charge of the battery. The charge management strategy may include charging the battery to an above-rated charge voltage during selected portions of the eclipse season.

Implementations of the subject matter described in this specification may be implemented as one or more computer programs, i.e., one or more modules of computer program instructions, encoded on non-transitory computer readable medium for execution by, or to control the operation of, a data processing apparatus, such as, for example, computer 113.

Thus, improved techniques for battery charge management for geosynchronous spacecraft have been disclosed. The foregoing merely illustrates principles of the invention. It will thus be appreciated that those skilled in the art will be able to devise numerous systems and methods which, although not explicitly shown or described herein, embody the principles of the invention and are thus within the spirit and scope of the invention as defined by the following claims.

What is claimed is:

1. A spacecraft comprising:
a power subsystem, including a battery, the battery including a plurality of battery cells, and a battery charge controller, wherein
the spacecraft is configured to be operated in a geosynchronous orbit;
each cell has a respective energy capacity at a rated charge voltage;
the spacecraft is configured to have a power demand, during an eclipse season of the geosynchronous orbit, of 'P' kilowatts and the battery is sized to have a nominal capacity measured in kilowatt-hours, smaller than 1.2*P/0.85; and
the battery charge controller is configured to execute a battery charge management strategy, during the eclipse season, that charges the battery cells to an above-rated charge voltage, higher than the rated charge voltage, during selected portions of the eclipse season.

2. The spacecraft of claim 1, wherein the above-rated charge voltage is at least 5% higher than the rated charge voltage.

3. The spacecraft of claim 1, wherein the selected portions of the eclipse season include only selected days centrally located within the eclipse season.

4. The spacecraft of claim 1, wherein the battery charge management strategy results in a maximum depth of discharge of the battery no greater than 80%.

5. The spacecraft of claim 1, wherein the battery charge controller is configured to execute the battery charge management strategy autonomously.

6. The spacecraft of claim 1, wherein the battery is a lithium-ion battery.

7. The spacecraft of claim 6, wherein the rated charge voltage is 4.1 volts, and the above-rated charge voltage is 4.3 volts.

8. A method, comprising:
operating a spacecraft in a geosynchronous orbit, the spacecraft comprising a power subsystem, the power subsystem including a battery, the battery including a plurality of battery cells, and a battery charge controller; and
executing a battery charge management strategy for controlling a state of charge of the battery; wherein:
each cell has a respective energy capacity at a rated charge voltage;
the spacecraft is configured to have a power demand, during an eclipse season of the geosynchronous orbit, of 'P' kilowatts and the battery is sized to have a nominal capacity, at a rated charge voltage, measured in kilowatt-hours, smaller than 1.2*P/0.85; and
the battery charge management strategy includes charging the battery cells to an above-rated charge voltage, higher than the rated charge voltage, during selected portions of the eclipse season.

9. The method of claim 8, wherein the above-rated charge voltage is at least 5% higher than the rated charge voltage.

10. The method of claim 8, wherein the selected portions of the eclipse season include only selected days centrally located within the eclipse season.

11. The method of claim 8, wherein the battery charge management strategy results in a maximum depth of discharge of the battery no greater than 80%.

12. The method of claim 8, wherein the battery charge controller is configured to execute the battery charge management strategy autonomously.

13. The method of claim 8, wherein the battery is a lithium-ion battery.

14. The method of claim 13, wherein the rated charge voltage is 4.1 volts, and the above-rated charge voltage is 4.3 volts.

15. A non-transitory computer readable medium having software stored thereon, the software including instructions for causing a battery charge controller to:
execute a charge management strategy for controlling a state of charge of a battery the battery being included in a spacecraft operating in a geosynchronous orbit and including a plurality of battery cells; wherein:
each cell has a respective energy capacity at a rated charge voltage;
the spacecraft is configured to have a power demand, during an eclipse season of the geosynchronous orbit, of 'P' kilowatts and the battery is sized to have a nominal capacity, at a rated charge voltage, measured in kilowatt-hours, smaller than 1.2*P/0.85; and the battery charge management strategy includes charging the battery cells to an above-rated charge voltage, higher than the rated charge voltage, during selected portions of the eclipse season.

16. The computer readable medium of claim 15, wherein the battery charge management strategy results in a maximum depth of discharge of the battery no greater than 80%.

17. The computer readable medium of claim 15, wherein the software includes instructions for causing the battery charge controller to execute the battery charge management strategy autonomously.

\* \* \* \* \*